US012149601B2

United States Patent
Su et al.

(10) Patent No.: US 12,149,601 B2
(45) Date of Patent: Nov. 19, 2024

(54) METHOD FOR CONVERTING NETWORK PACKETS AND CIRCUIT SYSTEM

(71) Applicant: REALTEK SEMICONDUCTOR CORP., Hsinchu (TW)

(72) Inventors: Tsung-Yin Su, Hsinchu (TW); Tsung-Yu Lee, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 115 days.

(21) Appl. No.: 17/958,622

(22) Filed: Oct. 3, 2022

(65) Prior Publication Data

US 2023/0107822 A1    Apr. 6, 2023

(30) Foreign Application Priority Data

Oct. 5, 2021   (TW) ................................. 110136976

(51) Int. Cl.
| | |
|---|---|
| *H04L 69/08* | (2022.01) |
| *H04L 61/251* | (2022.01) |
| *H04L 61/255* | (2022.01) |
| *H04L 69/167* | (2022.01) |

(52) U.S. Cl.
CPC ............ *H04L 69/08* (2013.01); *H04L 61/251* (2013.01); *H04L 61/255* (2013.01); *H04L 69/167* (2013.01)

(58) Field of Classification Search
None
See application file for complete search history.

(56) References Cited

U.S. PATENT DOCUMENTS

| | | | | |
|---|---|---|---|---|
| 11,456,988 | B1* | 9/2022 | Mereddy | H04L 45/02 |
| 2001/0053156 | A1* | 12/2001 | Higuchi | H04L 69/18 |
| | | | | 370/467 |
| 2009/0304026 | A1* | 12/2009 | Hamada | H04L 69/085 |
| | | | | 370/466 |
| 2013/0235871 | A1 | 9/2013 | Brzozowski et al. | |
| 2013/0287025 | A1 | 10/2013 | Hsue et al. | |
| 2022/0045983 | A1* | 2/2022 | Carter | H04L 12/2829 |
| 2022/0046116 | A1* | 2/2022 | Carter | H04L 61/4511 |

OTHER PUBLICATIONS

Nakajima, Kobayashi, "IPV4/IPv6 Translation Technology," Fujitsu, https://www.fujitsu.com/global/documents/about/resources/publications/fstj/archives/vol40-1/paper21.pdf (Year: 2003).*

* cited by examiner

*Primary Examiner* — William G Trost, IV
*Assistant Examiner* — Christopher P Cadorna
(74) *Attorney, Agent, or Firm* — Li & Cai Intellectual Property (USA) Office

(57) ABSTRACT

A method for converting network packets and a circuit system are provided. The circuit system uses firmware therein to record tables for implementing packet conversion between two types of networks (IPv4 and IPv6). In the method, a process of mapping of address and port using encapsulation (MAP-E) or a process of mapping of address and port using translation (MAP-T) is determined according to IPv4 packets routing requirement to embody an uplink and a downlink packet conversion process. A content table stores an IPv6 packet header after the MAP-E or MAP-T process. A control table is referred to for controlling the fields to be updated when adding the IPv6 packet header. A forwarding mapping rule table is referred to for determining to convert a destination IP address of an uplink IPv6 packet, or both a source IP address and a destination IP address of a downlink IPv4 packet.

14 Claims, 7 Drawing Sheets

| 0 | 8 | 16 | 24 | 32 | 40 | 48 | 56 | 64 | 72 | 80 | 88 | 96 | 104 | 112 | 120 |
|---|---|---|---|---|---|---|---|---|---|---|---|---|---|---|---|
| ipv6_address_prefix64 | | | | | | | | 0 | v4(32) | | | | PSID | | 0 |

| 0 | 8 | 16 | 24 | 32 | 40 | 48 | 56 | 64 | 72 | 80 | 88 | 96 | 104 | 112 | 120 |
|---|---|----|----|----|----|----|----|----|----|----|----|----|-----|-----|-----|
| ipv6_address_prefix64 ||||||||  0  | v4(32) |||| PSID || 0 |

FIG. 1

| 0 | 8 | 16 | 24 | 32 | 40 | 48 | 56 | 64 | 72 | 80 | 88 | 96 | 104 | 112 | 120 |
|---|---|----|----|----|----|----|----|----|----|----|----|----|-----|-----|-----|
| ipv6_address_prefix64 |||||||| 0 ||| v4(32) |||| 0 ||

FIG. 2

| prefix length | 0 | 8 | 16 | 24 | 32 | 40 | 48 | 56 | 64 | 72 | 80 | 88 | 96 | 104 | 112 | 120 |
|---|---|---|---|---|---|---|---|---|---|---|---|---|---|---|---|---|
| 32 | prefix | | | | v4(32) | | | | 0 | | | | suffix | | | |
| 40 | prefix | | | | | v4(24) | | | 0 | 0 | | | suffix | | | |
| 48 | prefix | | | | | | v4(16) | | 0 | 0 | 0 | | suffix | | | |
| 56 | prefix | | | | | | | (8) | 0 | 0 | 0 | 0 | suffix | | | |
| 64 | prefix | | | | | | | | 0 | 0 | 0 | 0 | suffix | | | |
| 96 | prefix | | | | | | | | | | | | v4(32) | | | |

FIG. 3

METHOD FOR CONVERTING NETWORK PACKETS AND CIRCUIT SYSTEM

CROSS-REFERENCE TO RELATED PATENT APPLICATION

This application claims the benefit of priority to Taiwan Patent Application No. 110136976, filed on Oct. 5, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure is related to a method for converting network packets between networks, and more particularly to a method for converting network packets by referring to a lookup table in a circuit and a circuit system.

BACKGROUND OF THE DISCLOSURE

Currently, the Internet protocol version 4 (IPv4) uses a 32-bit address field for an Internet protocol (IP) address. Since the IPv4 only provides 2 to the power of 32 network addresses, the IPv4 network addresses have been depleted after allocation. Therefore, the Internet protocol version 6 (IPv6) that uses a 128-bit address field for an IP address has been developed. The number of network addresses provided by the IPv6 communication protocol is significantly more than that of the network addresses provided by the IPv4. With the gradual popularization of the IPv6, the Internet environment has entered an era of coexistence of the IPv4 and the IPv6, and accordingly, demands for packet transmission between the IPv4 network and the IPv6 network also increases.

Conventionally, solutions to packet transmission between IPv4 network and IPv6 network generally include an address translation method and a tunneling method that are related to a process of mapping of address and port using translation (MAP-T) and a process of mapping of address and port using encapsulation (MAP-E) respectively for conversion between IPv4 network and IPv6 network. The MAP-T is configured to translate an original IPv4 packet header into an IPv6 packet header. The MAP-E uses an IPv6 tunnel to tunnel IPv6 packets through an existing IPv4 network.

However, both MAP-T and MAP-E operations are generally implemented by software, and therefore consume a lot of computing resources that often require cooperation of high-performance hardware.

SUMMARY OF THE DISCLOSURE

The present disclosure is related to a method for converting network packets and a system thereof. In the method, the arrangement and setting of fields in a table are utilized for implementing a conversion of packets from an IPv4 network to an IPv6 network in an uplink path, or from the IPv6 network to the IPv4 network in a downlink path. The method is adopted to a process of mapping of address and port using translation (MAP-T) and a process of mapping of address and port using encapsulation (MAP-E). The method can be implemented in a circuit system, for example, an application-specific integrated circuit (ASIC), for the purpose of performance enhancement.

The circuit system can be applied to a network device, and a firmware of the circuit system is configured to include hardware tables having fields used to convert IPv4 packets into IPv6 packets. According to embodiments of the method for converting network packets, in an uplink process, firstly, the tables such as a content table, a control table, and a forwarding mapping rule (FMR) table are determined. A length field of an IPv6 packet header recorded in the content table is inserted to a prefix of an IPv4 packet header. A length field of the IPv6 packet header recorded in the control table is referred to so as to update the length field of the IPv6 packet header inserted to the prefix of the IPv6 packet header. Next, a destination IP address (DIP) of the IPv6 packet can be determined according to whether or not any FMR table is specified. Afterwards, the portion relating to the IPv4 packet in the destination IP address (DIP) of the IPv6 packet can be updated, such that the IPv4 packet is successfully converted to the IPv6 packet.

Preferably, in the method, a process of mapping of address and port using encapsulation (MAP-E) or a process of mapping of address and port using translation (MAP-T) is adopted in an output interface according to a requirement for routing the IPv4 packets.

Preferably, the content table stores the IPv6 packet header that is inserted and converted by the process of mapping of address and port using translation (MAP-T) and the process of mapping of address and port using encapsulation (MAP-E). The control table is used to control a field to be updated after the IPv6 packet header is added on. The FMR table is used to determine the conversion of the destination IP address (DIP) for uplink IPv6 packets, and the conversion between the source IP address (SIP) and the destination IP address (DIP) for downlink IPv4 packets.

In one further aspect of the circuit system of the present disclosure, firmware-based hardware table fields are used to implement packet conversion between the IPv6 packets and IPv4 packets. In the process of the method for converting network packets for downlink packets, the MAP-E process or the MAP-T process is determined to be used in the method according to a virtual local area network and a DIP recorded in the IPv6 packet header. Afterwards, the control table is used to determine a header to be converted to the IPv4 packet according to the IPv6 packet header, such that the process for converting the IPv6 packets to the IPv4 packets is completed.

In the process of mapping of address and port using encapsulation (MAP-E), according to the control table relevant to the process of MAP-E, the header that has an outer layer in compliance with the IPv6 communication protocol is removed if the IPv6 packet is encapsulated by the outer layer in compliance with the IPv6 communication protocol and an inner layer in compliance with an IPv4 communication protocol.

On the other hand, in the process of mapping of address and port using translation (MAP-T), according to the control table relevant to the process of MAP-T, the IPv6 packet header is removed and inserted into an IPv4 packet header if the IPv6 package is encapsulated by only one layer in compliance with IPv6 protocol.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which:

FIG. 1 shows an example of a packet header specification depicting a destination IP address (DIP) of an IPv4 packet to be converted to an IPv6 packet;

FIG. 2 shows another example of a packet header specification depicting another destination IP address (DIP) of an IPv4 packet to be converted to an IPv6 packet;

FIG. 3 is an example depicting a conversion table that is referred to for converting a destination IP address (DIP) of an IPv4 packet into an IPv6 packet according to a prefix length of the IPv4 packet;

DETAILED DESCRIPTION OF THE EXEMPLARY EMBODIMENTS

Figure 4:
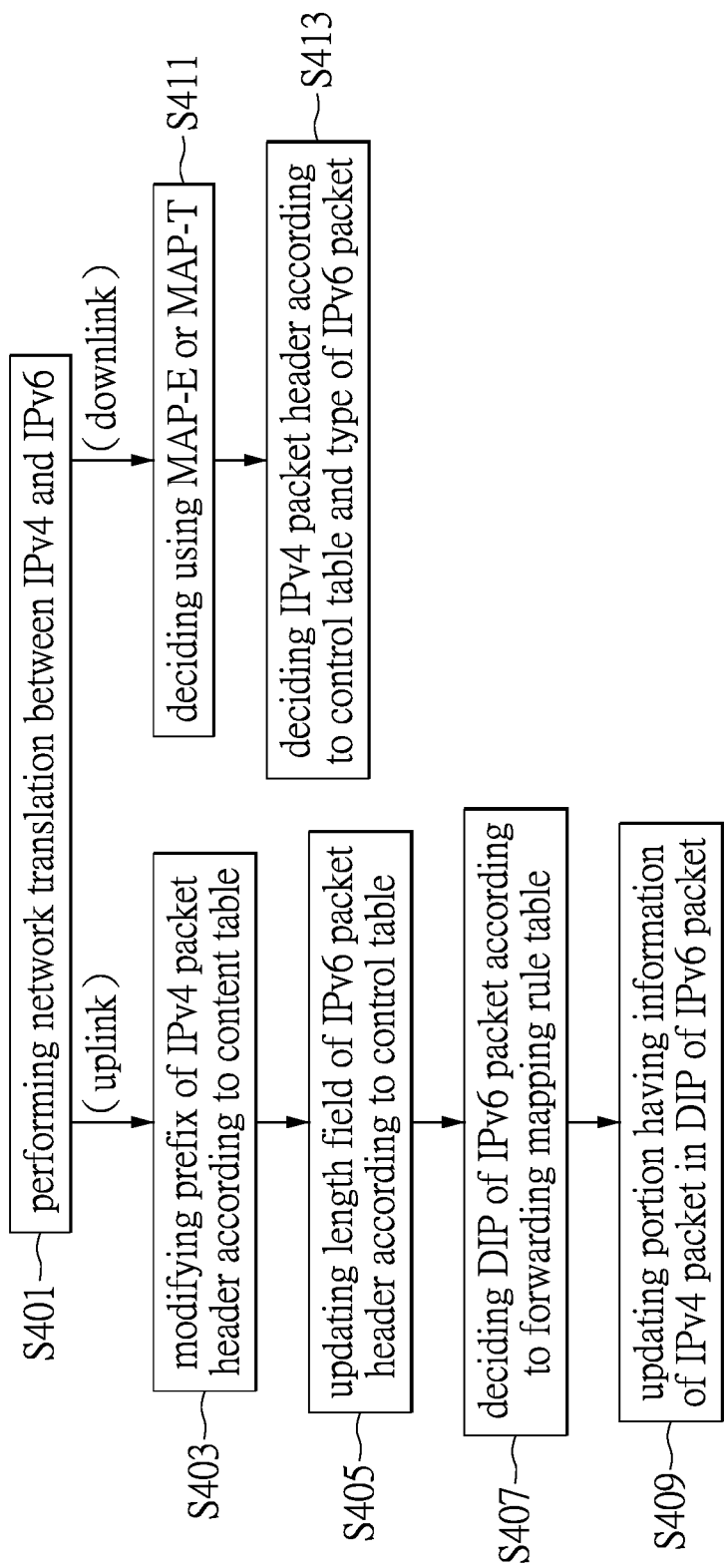
FIG. 4 is a flowchart describing a method for converting network packets in both an uplink path and a downlink path according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Conventional processes of MAP-T (mapping of address and port using translation) and MAP-E (mapping of address and port using encapsulation) are software-implemented for converting packet formats between an IPv4 network and an IPv6 network. In particular, both MAP-T and MAP-E technologies are used to dynamically perform conversion between a source IP address (SIP) and a destination IP address (DIP) according to a transportation layer (L4) port such as a TCP/UDP communication port. Therefore, it is difficult to perform hardware acceleration by simply using a circuit lookup table.

One shortcoming to be improved in the process of mapping of address and port using translation (MAP-T) and the process of mapping of address and port using encapsulation (MAP-E) used for converting packets between the IPv4 network and the IPv6 network is that, a lot of computing resources is consumed in the conventional technologies. The method and the system for converting network packets are provided in the present disclosure for implementing packet conversion between the IPv4 network and the IPv6 network in both an uplink path and a downlink path through fields of a table and settings of the MAP-E and the MAP-T processes. Accordingly, uplink and the downlink processes can undergo hardware acceleration via a circuit system, such as an application-specific integrated circuit (ASIC).

In the method for converting network packets of the present disclosure, hardware-based conversion rules are provided. For example, a content table is used to store an IPv6 packet header that is configured to be inserted in the MAP-T process or the MAP-E process, a control table is configured to control a field to be updated after the IPv6 packet header is added on, and a forwarding mapping rule (FMR) table is configured to convert the destination IP address (DIP) of an uplink packet from the IPv4 network to the IPv6 network in the MAP-E or MAP-T process, and convert both the source IP address (SIP) and the destination IP address (DIP) of a downlink packet from the IPv6 network to the IPv4 network in the MAP-T process.

It should be worth noting that the method for converting network packets of the present disclosure particularly supports the packet format of the conventional MAP-E/MAP-T, in which the above-mentioned content table, the control table, and the FMR table are established, and the fields specified to the packet are automatically updated.

The lookup tables adopted in the method for converting network packets include a content table recorded in the circuit system. The content table is relevant to an interface specified to the MAP-T or the MAP-E. The interface can be a combination of information relating to an IP address and a communication port. The information of the interface can be used to determine whether the MAP-E or the MAP-T is to be adopted in the circuit system. In an exemplary example, with the IPv4 packet in the content of the interface as an example, for determining the information of the interface that adopts the MAP-T or the MAP-E by querying the relevance, the IPv4 packet header is as follows:

L3 destination IP: 10.10.10.10=0x0a0a0a0a.
L3 source IP: 11.11.11.11=0x0b0b0b0b.
L4 destination port: 0x1234.
L4 source port: 0x5678.

The content table is used to store a basic IPv6 packet format. If the MAP-T process or the MAP-E process is used to insert a converted IPv6 packet header, the converted IPv6 packet header can be used as a basis to modify a control table. The content table includes a 40-byte IPv6 packet header. An exemplary example of a destination IP recorded in the content table can be:
0000:0001:0002:0003:0004:0005:0006:0007:0008.

The control table is also relevant to the interface that is a combination of a network address and a communication port. The control table is used to control a field to be updated after the IPv6 packet header is added on. The field to be updated is to configure an operation when a header of the content table is added to the packet. An exemplary example of the control table is as follows.

An example of the control table for MAP-E:
control.len=40;
control.format=MAP-E type; and
control.ipv6_len_diff=0.
An example of the control table for MAP-T:
control.len=40;
control.format=MAP-T type;
control.ipv6_len_diff=0;
contorl.mapt_14_sum_recalculate=1; and
control.mapt_prefix_len=64.

The fields defined in the control table are as follows.

A field of format (format) is used to record an entry that enter a packet is of a MAP-T type format or a MAP-E type format.

A field of length (len) is used to record a length of the IPv6 packet header in the content table.

A field of IPv6 length difference (ipv6_len_diff) is used to record a length of the IPv6 packet header that is to be inserted for updating a length field of the IPv6 packet header.

A field of MAP-T prefix length (mapt_prefix_len) is used to record a length of a prefix of the MAP-T.

A field of MAP-T draft version (mapt_draft_ver) is used to record whether a draft version of a request for comments (RFC) is used in an IPv6 source IP address (ipv6.sip) of a version of the MAP-T.

A field of mapt_14_sum_recalculate is used to indicate that, a MAP-T recalculate L4 checksum requires a pseudo IP address of the inserted IPv6 packet header to recalculate a checksum.

The FMR table is used to determine a process for converting a destination IP address (DIP) of an uplink IPv4 packet to an IPv6 packet based on the MAP-E/MAP-T process, and a process for converting a source IP address (SIP) and a destination IP address (DIP) of a downlink IPv6 packet to an IPv4 packet based on the MAP-T method. The FMR table is exemplarily described as follows:
FMR.ipv6_address_prefix64=0123:4567:89ab:cdef.
FMR.PSID_refill=1.
FMR.PSID_start_offset=2.
FMR.PSID_end_offset=9.
FMR.draft_ver=0.

The fields defined in the FMR table are as follows.

A field of IPv6 packet prefix address (ipv6_address_prefix64) includes an IPv6 prefix rule (rule-ipv6-prefix) and an identifier (EA-bits) used to identify a user, and the rule-ipv6-prefix and the EA-bits are 64 bits in total. The EA-bits includes an IPv4 subnet identification and a port set ID (PSID) that is used to identify every unique user.

A field of PSID_start_offset is used to record a starting point of a 16-bit destination port in a layer 4 transport protocol of the PSID.

A field of PSID_end_offset is used to record an ending point of a 16-bit destination port in the layer 4 transport protocol of the PSID.

A field of PSID_refill is used to record whether or not the field of PSID in a destination ID address of an IPv6 packet is dynamically modified.

A field of end user IPv6 packet prefix (end_user_ipv6_prefix) is used to record bits of an IPv6 prefix and a length of the EA-bits that is used to identify the user.

A draft version (draft_ver) is used to record whether or not a remote version uses the draft version of the request for comments (RFC draft).

The PSID can be retrieved from the starting point and the ending port of the destination port of the layer 4 transport protocol in the fields of PSID_start_offset and PSID_end_offset. If the length of the PSID is 0, the field of PSID_refill is set to 0.

Reference is made to FIG. 1, which is an example of a specification of a destination IP address (DIP) of an IPv6 network packet. For example, if a draft version (draft_ver) equals to 1 (i.e., draft_ver=1), a prefix of the DIP of an IPv6 network packet records an IPv6 address. The fields of v4(32) indicate a destination IP address (DIP) of an IPv4 packet. The fields of PSID indicate a port set ID (PSID). FIG. 1 is an exemplary example of the packet specification of the DIP for a conversion from the IPv4 packet to the IPv6 network packet.

FIG. 2 shows another exemplary example of the destination IP address (DIP) of the packet specification when the draft version (draft_ver) equals to 0 (i.e., draft_ver=0).

If no FMR table is specified In the MAP-T method, a default mapping rule (DMR) is provided. The IPv6 packets may be converted according to different MAP-T prefix lengths recorded in the control table. FIG. 3 shows an example of a conversion table that is incorporated to convert the IPv4 packets to a destination IP address of the IPv6 packets according to the prefix length. The conversion table records a prefix, a suffix and a network address in compliance with Internet protocol version 4. The conversion table is regarded as a default mapping rule that is referred to for converting IPv4 packets to an IPv6 network if no FMR table is specified in the method for converting network packets.

FIG. 4 is a flowchart describing the method for converting network packets for the uplink or downlink packets according to one embodiment of the present disclosure. The circuit system performs packet conversion between two different protocols, i.e., a first protocol and a second protocol. As shown but not limited to in the process of FIG. 4, the first protocol can be an IPv4 communication protocol and the second protocol can be an IPv6 communication protocol (step S401). In an uplink process, the IPv4 packets are converted to IPv6 packets. In a downlink process, the IPv6 packets are converted to IPv4 packets.

In the uplink process, the content table, the control table and the FMR table are firstly decided. For the IPv4 packets, the length field of the IPv6 packet header is inserted to the prefix of the IPv4 packet header according to the content table (step S403). Next, according to the length field of the IPv6 packet header recorded in the control table, the length field of the IPv6 packet header inserted to the prefix of the IPv4 packet header is updated (step S405). The destination IP address of the IPv6 packet can be decided according to whether or not the FMR table is specified (step S407). Afterwards, the portion of the IPv4 packet in the field of destination IP address of the IPv6 packet can be updated (step S409). Therefore, the IPv4 packet is converted to the IPv6 packet. References are made to both FIG. 6 and FIG. 7, which show the flowcharts of the abovementioned process of the present disclosure.

Figure 8:
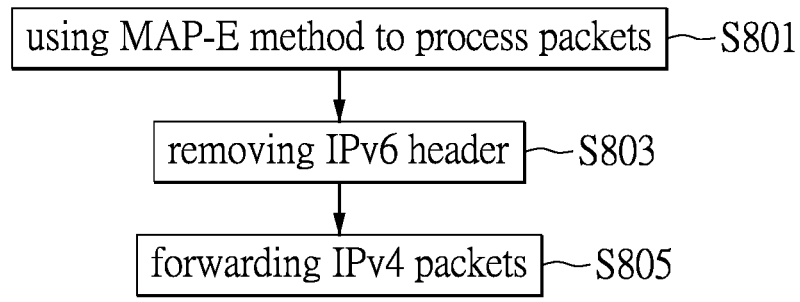
FIG. 8 is a flowchart describing a process of mapping of address and port using encapsulation performed on downlink packets in the method for converting network packets according to one embodiment of the present disclosure.
Figure 9:
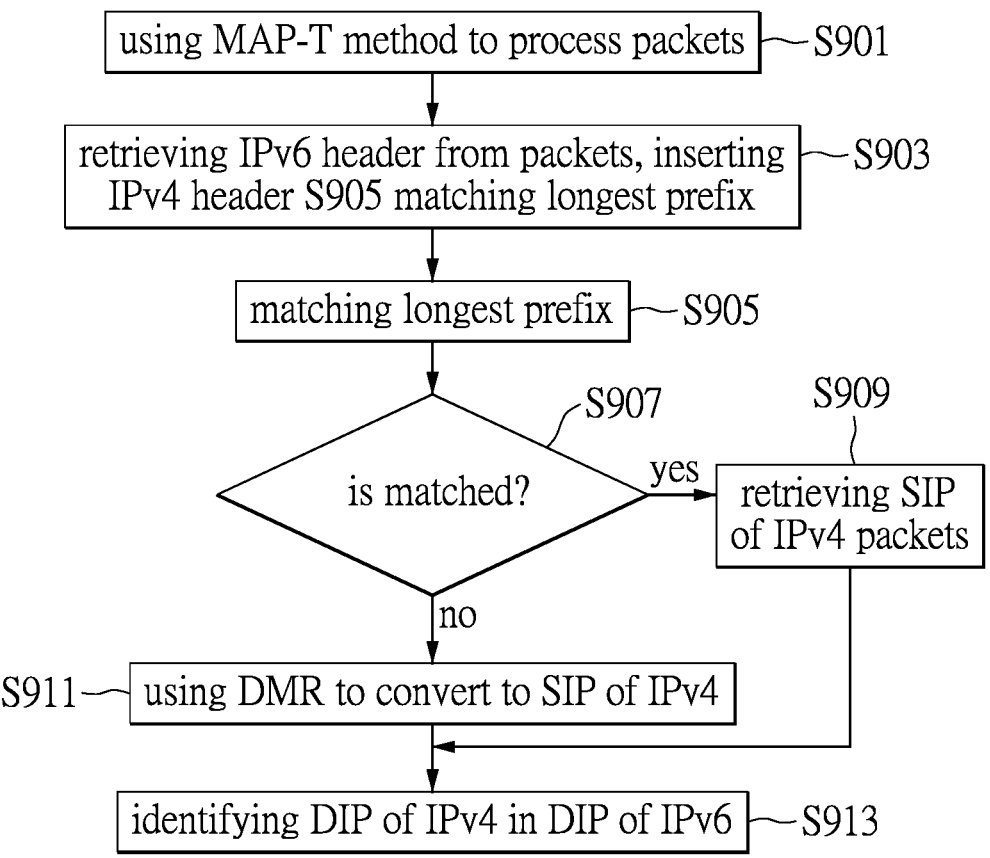
FIG. 9 is a flowchart describing a process of mapping of address and port using translation performed on downlink packets in the method for converting network packets according to one embodiment of the present disclosure.

In the downlink process, according to the information such as a virtual local area network (vlan) and the destination IP address recorded in the IPv6 packet header of the data flow to be processed, the MAP-E or the MAP-T is adopted (step S411). Next, the IPv6 packet header is converted to the IPv4 packet header according to the control table and the type of the IPv6 packet (step S413), and then the conversion from the IPv6 packet to the IPv4 packet is accomplished. FIG. 8 and FIG. 9 show flowcharts of the above-mentioned process of the method.

Figure 5:
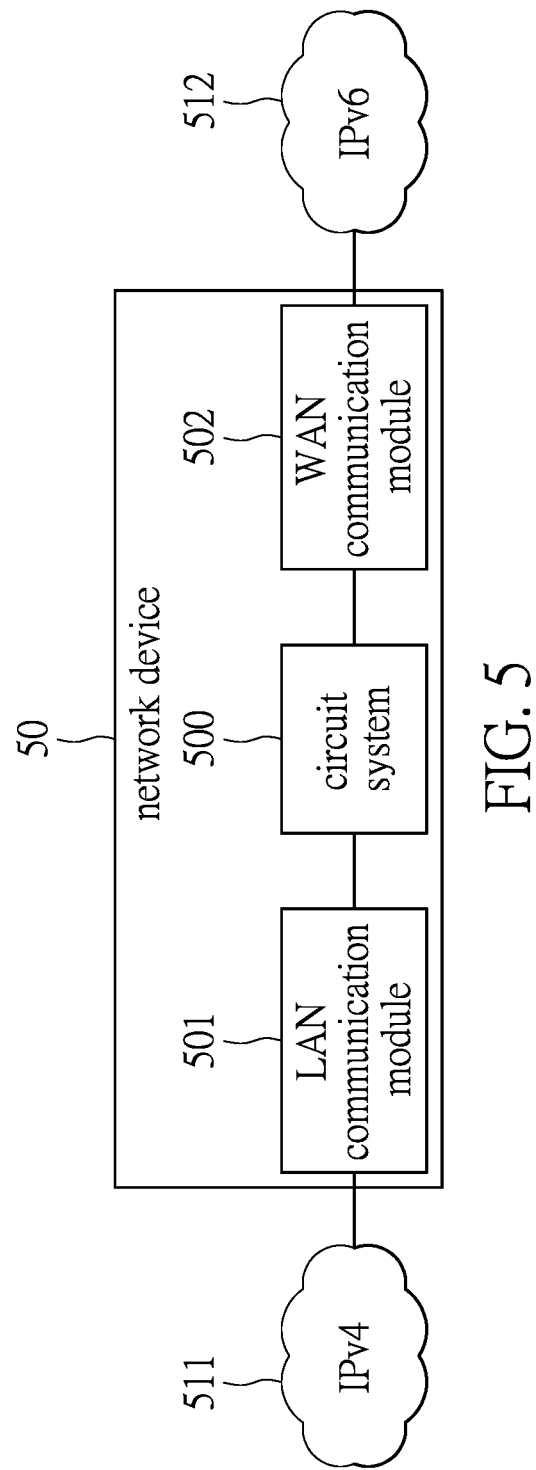
FIG. 5 is a schematic diagram depicting a circuit system performing the method for converting network packets according to one embodiment of the present disclosure.

FIG. 5 is a block diagram depicting the circuit system that performs the method in one embodiment of the present disclosure. A circuit system 500 is a packet processing circuit installed in a network device 50. The circuit system 500 can be implemented by an application-specific integrated circuit (ASIC). A firmware of the circuit system 500 is configured to include multiple fields in MAP-E/MAP-T-based hardware tables such as the above-mentioned content table, control table and FMR table. The circuit system 500 implements packet conversion for the uplink packets that can be defined as the IPv4 packets in an IPv4 network 511 being converted to the IPv6 packets in an IPv6 network 512, and for the downlink packets that can be defined as the IPv6 packets in the IPv6 network 512 being converted to the IPv4 packets in the IPv4 network 511. The circuit system 500 can implement a hardware acceleration for the packet conversion process.

The IPv4 network 511 can be operated in a local area network (LAN), and the IPv6 network 512 can be operated in a wide area network (WAN). The circuit system 500 can be a network router that performs packet routing. The circuit system 500 includes a LAN communication module 501 that is connected with the IPv4 network 511 that may include computer hosts, servers, and network devices. The circuit system 500 can therefore be used to process packets in the local area network. The circuit system 500 further includes a WAN communication module 502 that is connected with the IPv6 network 512 that may also include computer hosts, servers, and network devices for processing the packets in the wide area network.

When the IPv4 network 511 that is widely used is switched to the IPv6 network 512, the circuit system is configured to provide multiple tables having a plurality of fields that are well defined based on the MAP-E and/or MAP-T processes for implementing uplink and downlink packet conversion between the IPv4 network 511 and the IPv6 network 512.

Embodiment of MAP-E Method for Uplink Packets

Figure 6:
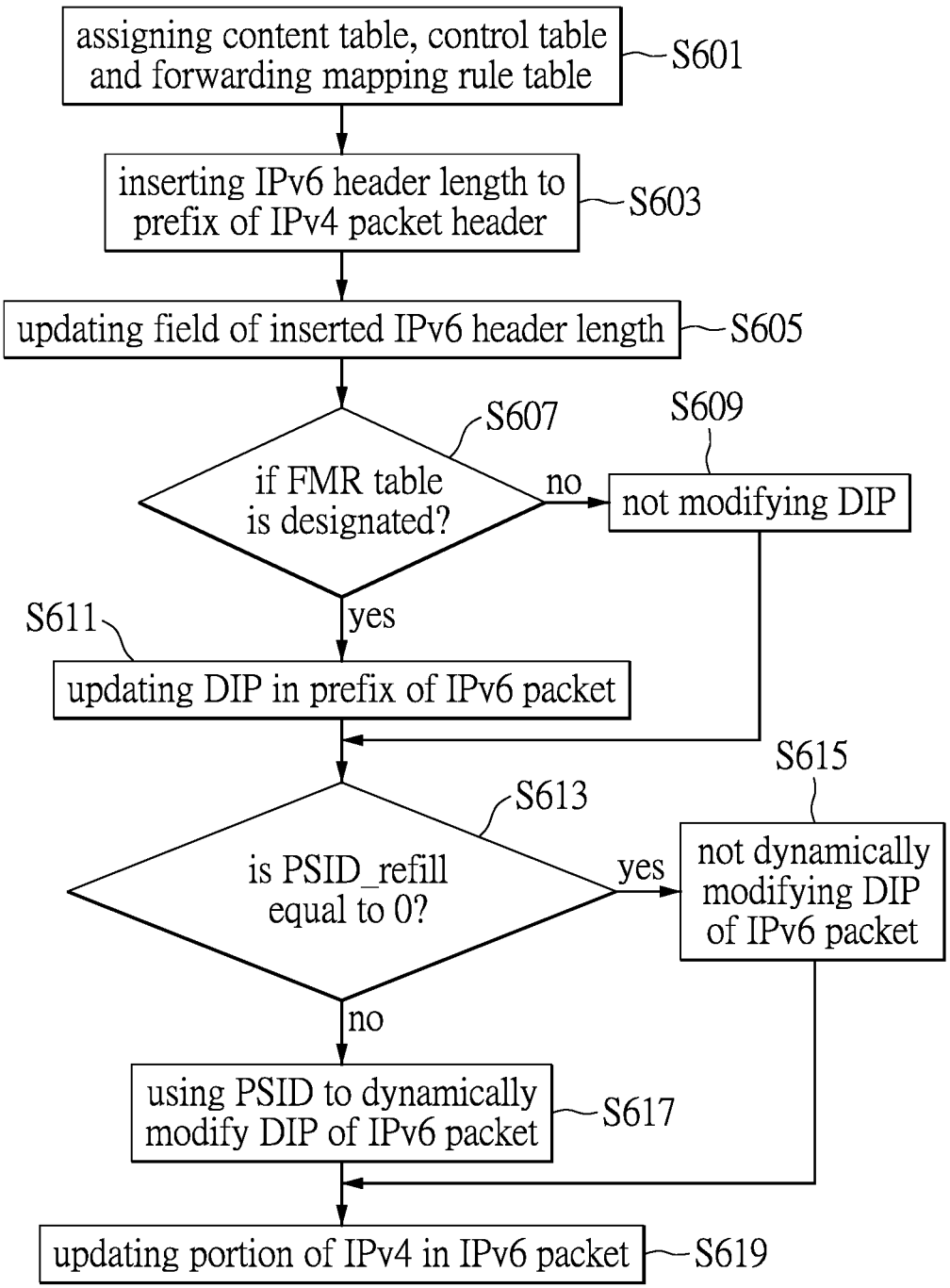
FIG. 6 is a flowchart describing a process of mapping of address and port using encapsulation performed on uplink packets in the method for converting network packets according to the present disclosure.

Based on the above mentioned mechanism of network packet conversion, reference is made to FIG. 6, which is a flowchart describing the process of mapping of address and port using encapsulation (MAP-E) for uplink packets, e.g., the packets in compliance with an IPv4 communication protocol are converted to packets in compliance with an IPv6 communication protocol, in the method for converting network packets according to one embodiment of the present disclosure. The process is preferably performed by a circuit system implemented via an ASIC.

Firstly, such as in step S601, a process of mapping of address and port using encapsulation (MAP-E) is adopted in an output interface according to a requirement for routing the IPv4 packets, and the data flow with respect to the network packets specifies a relevant content table, a control table, and an FMR table. Next, such as in step S603, a length field in the IPv6 packet header recorded in the content table is inserted to a prefix of the IPv4 packet header.

In step S605, a length field (header.len) is recorded in the control table and is configured to be inserted to an IPv6 packet header. The length field (header.len) is referred to so as to update the length field in the prefix of the IPv4 packet header, i.e., ipv6.len=control.ipv6_len_diff+ipv4.len. In the MAP-E process, a specified FMR table is a selectable option. In step S607, it is determined that whether or not any FMR table is specified. If no FMR table is specified, such as in step S609, the destination IP address in the packets does not need to be modified. On the contrary, if the destination IP address recorded in the header does not need to be modified. Otherwise, if an FMR table is specified, such as in step S611, the destination IP address in the prefix field of the IPv6 packet header to be converted is updated according to the field of IPv6 packet prefix address (ipv6_address_prefix64) recorded in the FMR table.

In step S613, it is determined that whether a field of PSID_refill in the FMR table is 0. If the field of PSID_refill in the FMR table is 0, and the length of PSID (PSID length) is 0, such as in step S615, the field of PSID of the destination IP address of the IPv6 does not need to be dynamically modified. On the contrary, if the field of PSID_refill in the FMR table is not 0, such as in step S617, the PSID retrieved from the information of the fields of PSID_start_offset and PSID_end_offset is incorporated to dynamically modify the PSID of the destination IP address of the IPv6 packets. The field of PSID can be placed in different positions in the IPv6 packet header due to the different draft versions, e.g., draft_ver=1 of FIG. 1 and draft_ver=0 of FIG. 2, recorded in the FMR table.

Finally, regardless of whether or not the field of PSID in the destination IP address of the IPv6 packet is modified, such as in step S619, the portion relating to the IPv4 packet in the destination IP address of the IPv6 packet is updated so as to accomplish the packet conversion of the uplink packets, i.e., the IPv4 packets are converted to the IPv6 packets.

Embodiment of MAP-T Method for Uplink Packets

Figure 7:
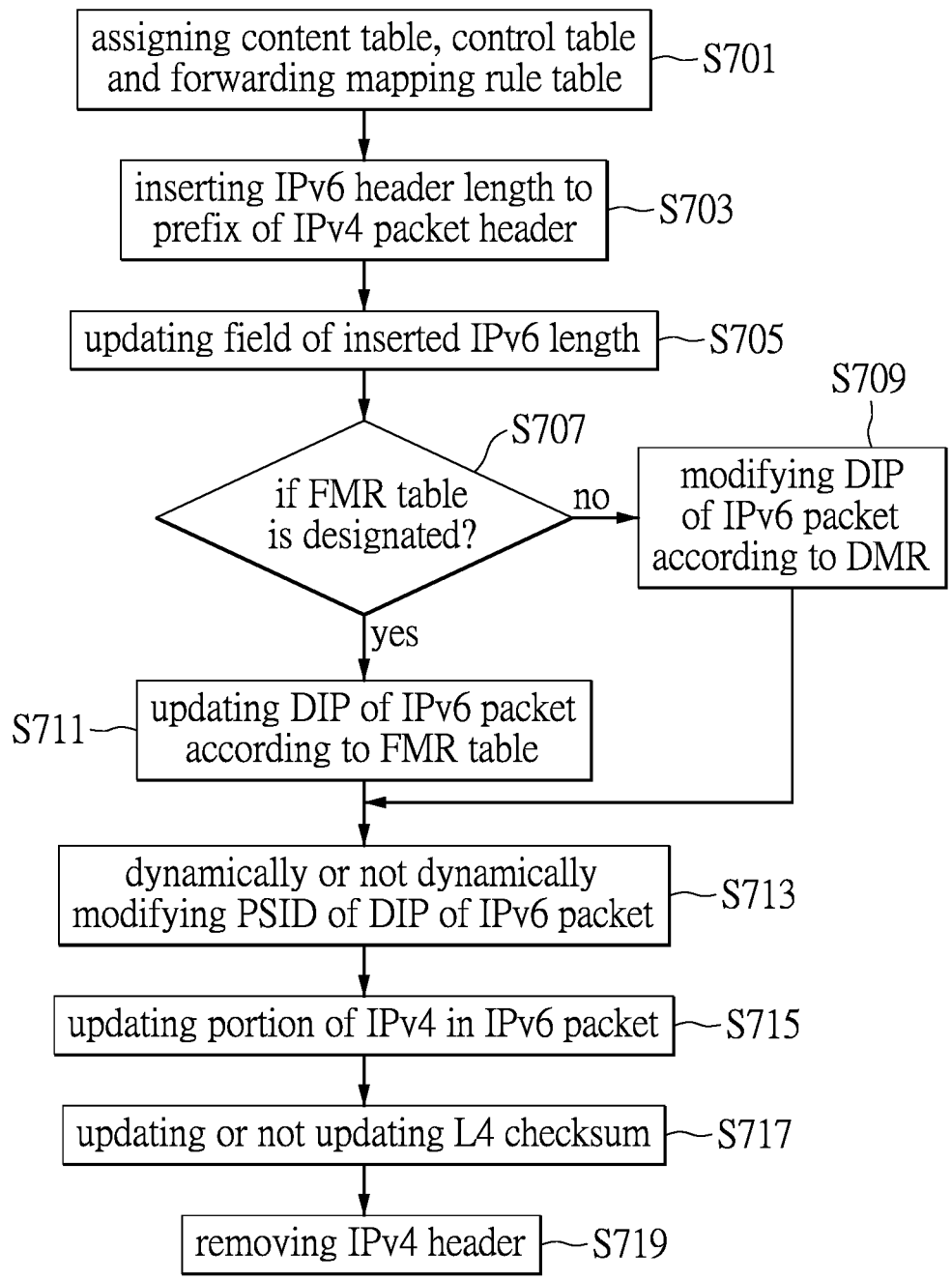
FIG. 7 is a flowchart describing a process of mapping of address and port using translation performed on uplink packets in the method for converting network packets according to one embodiment of the present disclosure.

FIG. 7 shows a flowchart describing a process of mapping of address and port using translation (MAP-T) that is used for uplink packets, i.e., packets in the IPv4 network are converted to the IPv6 network, in the method for converting network packets according to one embodiment of the present disclosure.

In the beginning, such as in step S701, the process of mapping of address and port using translation (MAP-T) is adopted in an output interface according to a requirement for routing the IPv4 packets. At this time, a content table, a control table, and an FMR table are specified for processing relevant data flow. In step S703, a length field of the IPv6 packet header recorded in the content table is inserted to the prefix of the IPv4 packet header. In step S705, a length field of the IPv6 packet header is inserted for updating the length field of the IPv6 packet header according to the control table.

Similarly, the FMR table can also be a selectable option. In step S707, it is determined that whether or not the FMR table is forwarded. If the FMR table is not forwarded, such as in step S709, the destination IP address of the IPv6 packet is modified according to a field of MAP-T prefix length (mapt_prefix_len) of the control table in the DMR table and the destination IP address of the IPv4 packet. Rather than the field of MAP-T prefix length of the control table mentioned above, step S709 is based on a different position to be modified in the destination IP address of the IPv6 packet.

On the contrary, if the FMR table is specified to be forwarded, such as in step S711, the prefix of the destination IP address of the IPv6 packet is updated according to the field of IPv6 packet prefix address (ipv6_address_prefix64) of the FMR table. In step S713, it is determined that whether or not to dynamically modify the field of PSID of the destination IP address of the IPv6 packet according to whether or not the PSID_refill field of the FMR table is 0, such as in steps S713 to S717 of FIG. 7. Finally, regardless of whether or not the field of PSID in the destination IP address of the IPv6 packet is modified, in step S715, the portion related to IPv4 packet in the destination IP address of the IPv6 packet is updated. Next, in step S717, the field of mapt_14_sum_recalculate of the control table is referred to for determining whether or not to update the layer 4 (L4) transport protocol checksum. At last, such as in step S719, the portion of IPv4 packet header is removed from the IPv6 packet header, and the conversion of the uplink packets is completed, i.e., the IPv4 packet is converted to the IPv6 packet.

Embodiment of MAP-E Method for Downlink Packets

References are made to FIG. 8 and FIG. 9, which are flowcharts describing the process for converting the downlink packets such as the IPv6 packets to the IPv4 packets. FIG. 8 is a flowchart describing the process of mapping of address and port using encapsulation for the downlink packets according to one embodiment of the present disclosure.

In the present embodiment, the process of mapping of address and port using encapsulation (MAP-E) is adopted according to the virtual local area network (vlan) and the destination IP address recorded in the IPv6 packet header (step S801). In the process, according to the MAP-E-related control table, the header having an outer layer in compliance with the IPv6 communication protocol is removed if the IPv6 packet is a type of IP-in-IP packet that is packaged by the outer layer of IPv6 communication protocol and an inner layer of IPv4 communication protocol (step S803). Afterwards, the conversion from the IPv6 packet to the IPv4 packet is accomplished, and the IPv4 packet with the IPv6 header being removed is forwarded (step S805).

Embodiment of MAP-T Method for Downlink Packets

FIG. 9 is a flowchart describing the process of mapping of address and port using translation for the downlink packets according to one embodiment of the present disclosure.

With the destination IP address (DIP) of the IPv6 packet header, examples of the DMR table, the FMR table, and the control table are as follows.
IPv6 Destination Address:
0123:4567:89ab:cdef:0000:0b0b:0b0b:009e.
DMR:
IPv6 Source Address: 0000:0001:0002:0003:000a:0a0a: 0a06:0007.

FMR:
IPv6 Source Address: 0123:4567:89ab:cdef:0004:0a0a: 0a0a:008d.
control table:
control.mapt_prefix_len=64.
control_mapt_draft_ver=0.
FMR table:
FMR[0]:
Ipv6_address_prefix64: 0123:4567:89ab:cdef;
end_user_ipv6_prefix:64; and
draft_ver=0.
FMR[1]:
Ipv6_address_prefix64: 0123:4567:89ab:cdef;
end_user_ipv6_prefix:32; and
draf_ver=1.

The process of mapping of address and port using translation (MAP-T) is determined to be adopted for converting the IPv6 packets to the IPv4 packets according to the virtual local area network (vlan) and the destination IP address (e.g., destination Internet protocol address) of the IPv6 packet header being packaged in an outer layer of the IPv6 packets (step S901). According to the control table relating to MAP-T, in the process of MAP-T method, when the type of the IPv6 packet is a packet packaged by a single layer IPv6 communication protocol, the IPv6 packet header is removed from the downlink packets, and then the IPv4 packet header are inserted into the downlink packets (step S903). It should be noted that, in the process for processing the downlink packets such as converting the IPv6 packets to the IPv4 packets, the source IP address and the destination IP address of the IPv4 packet header are inserted into the downlink packets according to the following rules.

The processing for the source IP address (SIP) is as follows. The source IP address is required to be inserted to the IPv4 packet header when the IPv6 packet is converted to the IPv4 packet. The source IP address of the IPv6 packet is compared with all records in the FMR table for performing longest prefix matching (step S905). The records in the FMR table include an IPv6 packet prefix address (ipv6_address_prefix64) and an end-user IPv6 packet prefix (end_user_ipv6_prefix). It should be noted that the longest prefix matching is a calculation for selecting a routing path, in other words, the routing path that matches with the most entries of header prefixes and destination addresses in the FMR table is selected from a routing table.

Afterwards, it is determined that whether or not the matching is successful (step S907). If there is a longest prefix matched, the FMR table is incorporated and the source IP address of the IPv4 packet can be retrieved according to the draft version (draft_ver) (step S909), referring to the exemplary examples shown in FIG. 1 and FIG. 2.

On the contrary, if the matching fails, it means that the DMR table is required to convert SIP to the SIP of the IPv4 packets (step S911). More specifically, the source IP address of the IPv4 packet can be retrieved according to a MAP-T prefix length (mapt_prefix_len) of the control table and the DMR table as shown in FIG. 3.

With SIP=0123:4567:89ab:cdef:0004:0a0a:0a0a:008d as an example, by querying the FMR table, the source IP address is matched with all of the 64 bits of FMR[0], and the source IP address is also matched with all of the 32 bits of FMR[1]. Even though both FMR[0] and FMR[1] are matched, FMR[0] is selected since more bits of FMR[0] are matched based on the rule of the longest prefix matching. Therefore, since FMR[0].draft_ver=0, referring to FIG. 2, it can be learned that SIP=0x0a0a0a0a=10.10.10.10.

With SIP=0000:0001:0002:0003:000a:0a0a:0a06:0007 (IPv6) as an example, the DMR table is used to convert back to the source IP address of the IPv4 packet if the matching fails when querying the FMR table. As shown in FIG. 3, the source IP address is 0x0a0a0a0a=10.10.10.10 since control.mapt_prefix_len=64.

The processing for the destination IP address (DIP) is as follows. In the process for converting the downlink packets to the IPv4 network, the field of mapt_draft_ver of the control table is referred to so as to identify the destination IP address of the IPv4 packet originally recorded in the destination IP address of the IPv6 packet header (step S913), as shown in the exemplary example of FIG. 1 and FIG. 2. Thus, the IPv6 packet is successfully converted to the IPv4 packet.

In one further example, a destination IP address is 0123: 4567:89ab:cdef:0000:0b0b:0b0b:009e. Referring to FIG. 2, the destination IP address of the IPv4 packet is 0x0b0b0b0b=11.11.11.11 since mapt_draft_ver=0 according to the control table.

In summation, the embodiments of the method for converting network packets perform the process of packet conversion for the uplink and downlink network packets through MAP-E and/or MAP-T process. The method is implemented by circuits or software, and preferably can be operated in the circuit system of the present disclosure that is implemented by an application-specific integrated circuit (ASIC) through a system on chip (SoC) technology. The circuit system is configured to provide hardware tables that are incorporated to convert the uplink packets such as IPv4 packets to the packets in compliance with IPv6 communication protocol. In certain aspects, a content table and setting of fields in a control table are incorporated to produce the IPv6 packet header. Further, setting of fields in an FMR table are incorporated to perform conversion of an IPv6 destination IP address (DIP) of the uplink packets through the process of mapping of address and port using translation (MAP-T) or the process of mapping of address and port using encapsulation (MAP-E), and also perform conversion of the source IP address (SIP) and the destination IP address (DIP) of the downlink packets, i.e., from IPv6 packets to IPv4 packets. Furthermore, the method accomplishes compatibility control of the draft version.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for converting network packets, used to convert a first protocol packet to a second protocol packet, comprising:
    inserting a length field of a second protocol packet header of the second protocol packet recorded in a content table into a prefix of a first protocol packet header of the first protocol packet;
    updating the length field of the second protocol packet header being inserted into the prefix of the first protocol packet header according to a length field of the second protocol packet header recorded in a control table;
    determining a destination IP address of the second protocol packet according to whether or not a forwarding mapping rule (FMR) table is specified; and
    updating a portion in the destination IP address of the second protocol packet relating to the first protocol packet, so as to complete a conversion from the first protocol packet to the second protocol packet, and, according to a requirement for routing the first protocol packets, a process of mapping of address and port using encapsulation (MAP-E) or a process of mapping of address and port using translation (MAP-T) is adopted in an output interface;
    wherein, in the process of mapping of address and port using encapsulation (MAP-E), when the destination IP address of the second protocol packet is determined, the destination IP address of the second protocol packet is updated according to an address field of the second protocol packet recorded in an FMR table; in response to the FMR table being specified, the destination IP address of the second protocol packet is updated according to a second protocol packet prefix address field recorded in the FMR table; and in response to the FMR table being not specified, the destination IP address of the second protocol packet is not to be updated;
    wherein, in the step for determining the destination IP address of the second protocol packet that adopts the process of mapping of address and port using translation (MAP-T), if the FMR table is specified, the destination IP address of the second protocol packet is updated according to a second protocol packet prefix address field recorded in the FMR table; wherein, if the FMR table is not specified, the destination IP address of the second protocol packet is modified according to a prefix length field in the process of mapping of address and port using translation (MAP-T) in the control table of a default mapping rule (DMR) table and a destination IP address of the first protocol packet.

2. The method according to claim 1, wherein the first protocol packet is an IPV4 packet, the second protocol packet is an IPV6 packet, the first protocol packet header is an IPv4 packet header, the second protocol packet header is an IPV6 header, and the IPV6 packet being in a larger addressing space than an addressing space of the IPV4 packet.

3. The method according to claim 1, wherein the step for determining the destination IP address of the second protocol packet further includes determining a port set ID (PSID) field of the destination IP address, including:
    determining whether a PSID_refill field of the FMR table is 0;
    wherein, the PSID field of the destination IP address of the second protocol packet needs not to be modified if the PSID_refill field of the FMR table is 0 and, if the PSID_refill field of the FMR table is not 0, the PSID field of the destination IP address in the second protocol packet is dynamically modified according to a PSID retrieved from fields of PSID_start_offset and a PSID_end_offset in the FMR table.

4. The method according to claim 1, wherein, when a portion relating to the first protocol packet header in the second protocol packet header is removed, the step for converting the first protocol packet to the second protocol packet is accomplished.

5. The method according to claim 1, wherein the content table stores the second protocol packet header to be converted by the process of mapping of address and port using translation and the process of mapping of address and port using encapsulation; wherein the control table is used to determine the fields that need to be updated after inserting the second protocol packet header; wherein the FMR table is used to convert the destination IP address of the uplink second protocol packet, and convert the source IP address and the destination IP address of first protocol packet in a downlink process.

6. A method for converting network packets, used to convert an IPV6 packet to an IPv4 packet, comprising:

in a downlink, determining whether to adopt a process of mapping of address and port using encapsulation (MAP-E) or a process of mapping of address and port using translation (MAP-T) according to a virtual local area network and a destination IP address recorded in an IPv6 packet header of the IPV6 packet;

wherein, in the process of mapping of address and port using encapsulation (MAP-E), when the destination IP address of the IPv6 packet is determined, the destination IP address of the IPV6 packet is updated according to an address field of the IPV6 packet recorded in an FMR table; in response to the FMR table being specified, the destination IP address of the IPV6 packet is updated according to an IPV6 packet prefix address field recorded in the FMR table; and in response to the FMR table being not specified, the destination IP address of the IPV6 packet is not to be updated; wherein, in the step for determining the destination IP address of the IPV6 packet that adopts the process of mapping of address and port using translation (MAP-T), if the FMR table is specified, the destination IP address of the IPV6 packet is updated according to a IPV6 packet prefix address field recorded in the FMR table; wherein, if the FMR table is not specified, the destination IP address of the IPV6 packet is modified according to a prefix length field in the process of mapping of address and port using translation (MAP-T) in a control table of a default mapping rule (DMR) table and a destination IP address of the IPV4 packet; and converting the IPV6 packet header to an IPV4 packet header of the IPV4 packet according to the control table and a type of the IPV6 packet so as to accomplish conversion from the IPv6 packet to the IPV4 packet.

7. The method according to claim 6, wherein, in the process of mapping of address and port using encapsulation, according to the control table, the IPV6 packet header that has an outer layer in compliance with an IPV6 communication protocol is removed if the IPv6 packet is packaged by the outer layer in compliance with the IPV6 communication protocol and an inner layer in compliance with an IPv4 communication protocol.

8. The method according to claim 6, wherein, in the process of mapping of address and port using translation, according to the control table, the IPV6 packet header is removed and an IPv4 packet header is inserted if the IPV6 packet is a single-layer IPv6 packet; wherein the IPV4 packet header includes a source IP address and a destination IP address.

9. The method according to claim 8, wherein the step of inserting the source IP address into the IPV4 packet header includes:

in a matching process, comparing the source IP address of the IPV6 packet with records in a forwarding mapping rule (FMR) table so as to determine if any match is found; and if the matching process is successful, introducing the FMR table for obtaining the source IP address of the IPv4 packet according to a draft version of the FMR table; if the matching process fails, converting the source IP address of the IPV6 packet to the source IP address of the IPv4 packet according to the default mapping rule (DMR) table;

wherein the FMR table records an IPV6 packet prefix address and an end-user IPV6 packet prefix for matching a longest prefix.

10. The method according to claim 9, wherein, in the step of converting the source IP address of the IPV6 packet to the source IP address of the IPV4 packet according to the DMR table, the source IP address of the IPV4 is retrieved according to a MAP-T prefix length of the control table of the DMR table.

11. The method according to claim 8, wherein the step of inserting the destination IP address into the IPV4 packet header further includes identifying a composition of the destination IP address of the IPV4 packet in the destination IP address recorded in the IPV6 packet header according to a MAP-T draft version recorded in the control table, so as to convert the IPV6 packet into the IPV4 packet.

12. The method according to claim 6, wherein, according to a forwarding mapping rule (FMR) table, the process of mapping of address and port using encapsulation or the process of mapping of address and port using translation is determined to be used to process conversion of the destination IP address of the IPV6 packet, or the process of mapping of address and port using translation is determined to be used to process conversion of the source IP address and the destination IP address of the IPV4 packet.

13. A circuit system, in which a firmware is configured to include a table field, used to implement conversion from an IPV4 packet to an IPV6 packet, wherein the circuit system performs a method for converting network packets including steps of:

inserting a length field of an IPV6 packet header of the IPV6 packet recorded in a content table into a prefix of an IPV4 packet header of the IPV4 packet;

updating the length field of the IPV6 packet header being inserted into the prefix of the IPv4 packet header according to a length field of the IPV6 packet header recorded in a control table;

determining a destination IP address of the IPV6 packet according to whether or not a forwarding mapping rule (FMR) table is specified; updating a portion in the destination IP address of the IPV6 packet relating to the IPV4 packet, so as to complete a conversion from the IPV4 packet to the IPV6 packet;

determining whether to adopt the process of mapping of address and port using encapsulation (MAP-E) or the process of mapping of address and port using translation (MAP-T) according to a requirement for routing the first protocol packets; and converting the IPv6 packet header to an IPV4 packet header according to the control table and a type of the IPV6 packet so as to accomplish conversion from the IPV6 packet to the IPV4 packet;

wherein, in the process of mapping of address and port using encapsulation (MAP-E) when the destination IP address of the IPv6 packet is determined, the destination IP address of the IPv6 packet is updated according to an address field of the IPV6 packet recorded in an FMR table; in response to the FMR table being specified, the destination IP address of the IPV6 packet is updated according to an IPV6 packet prefix address field recorded in the FMR table; and in response to the FMR table being not specified, the destination IP address of the IPV6 packet is not to be updated;

wherein, in the step for determining the destination IP address of the IPV6 packet that adopts the process of mapping of address and port using translation (MAP-T), if the FMR table is specified, the destination IP address of the IPV6 packet is updated according to a IPV6 packet prefix address field recorded in the FMR table; wherein, if the FMR table is not specified, the destination IP address of the IPV6 packet is modified according to a prefix length field in the process of mapping of address and port using translation (MAP-T) in the control table of a default mapping rule (DMR) table and a destination IP address of the IPV4 packet.

14. The circuit system according to claim 13, wherein the content table stores the IPV6 packet header being processed by the process of mapping of address and port using translation (MAP-T)_or the process of mapping of address and port using encapsulation (MAP-E); wherein the control table is used to determine the fields that need to be updated after inserting the IPV6 packet header; wherein the FMR table is used to convert the destination IP address of the uplink IPV6 packet, and convert the source IP address and the destination IP address of the IPv4 packet in a downlink process.

* * * * *